Figure 4:
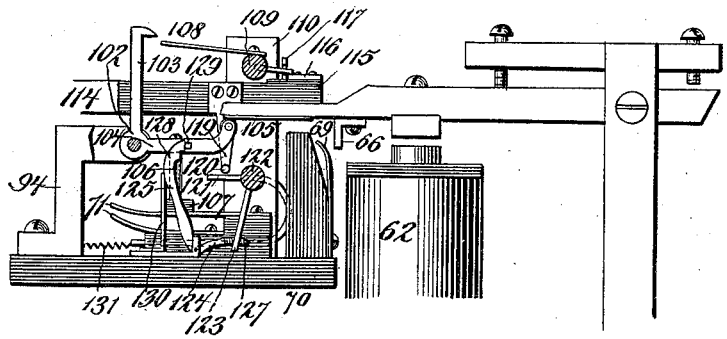

No. 673,315. Patented Apr. 30, 1901.
G. A. CARDWELL.
PRINTING TELEGRAPH.
(Application filed Nov. 18, 1899. Renewed Nov. 14, 1900.)
(No Model.) 10 Sheets—Sheet 1.
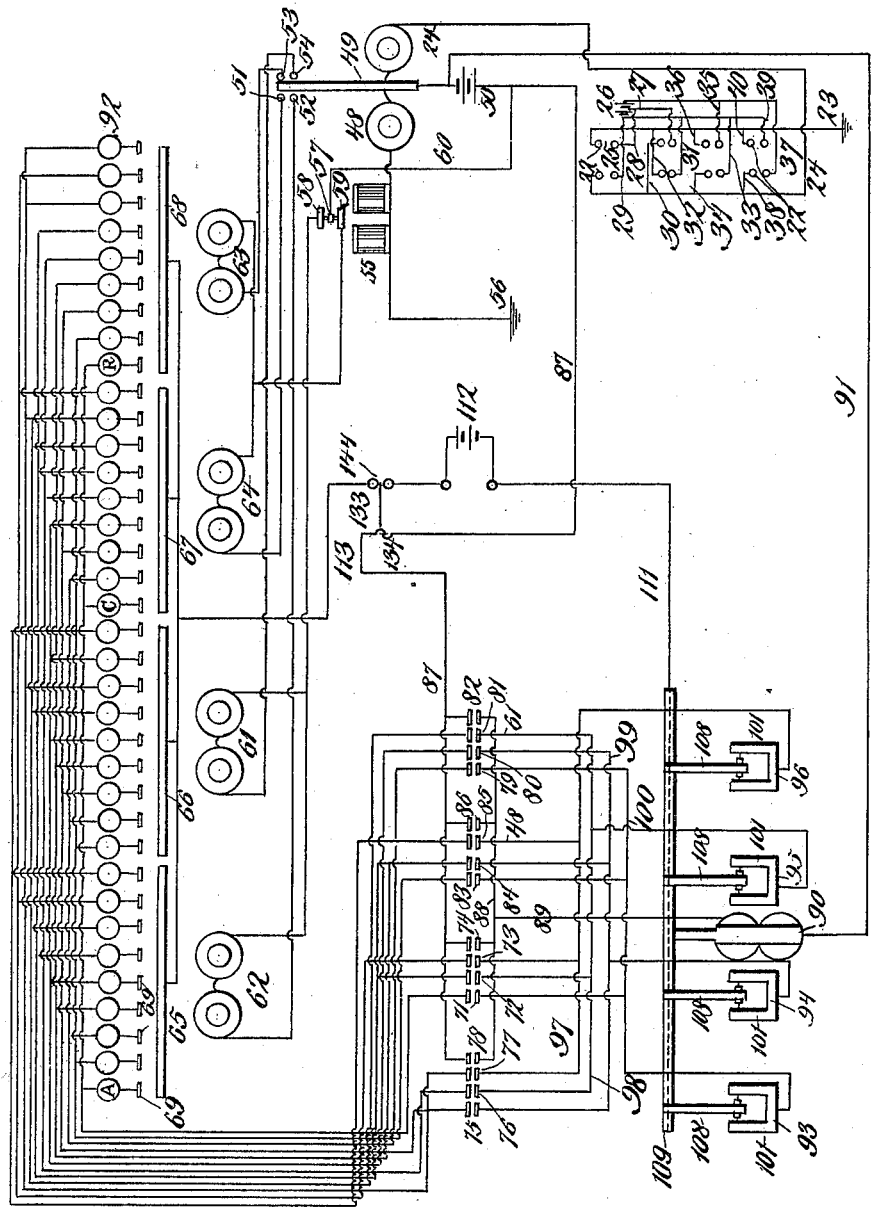
WITNESSES:
INVENTOR
BY
HIS ATTORNEY No. 673,315. Patented Apr. 30, 1901.
G. A. CARDWELL.
PRINTING TELEGRAPH.
(Application filed Nov. 18, 1899. Renewed Nov. 14, 1900.)
(No Model.) 10 Sheets—Sheet 2.
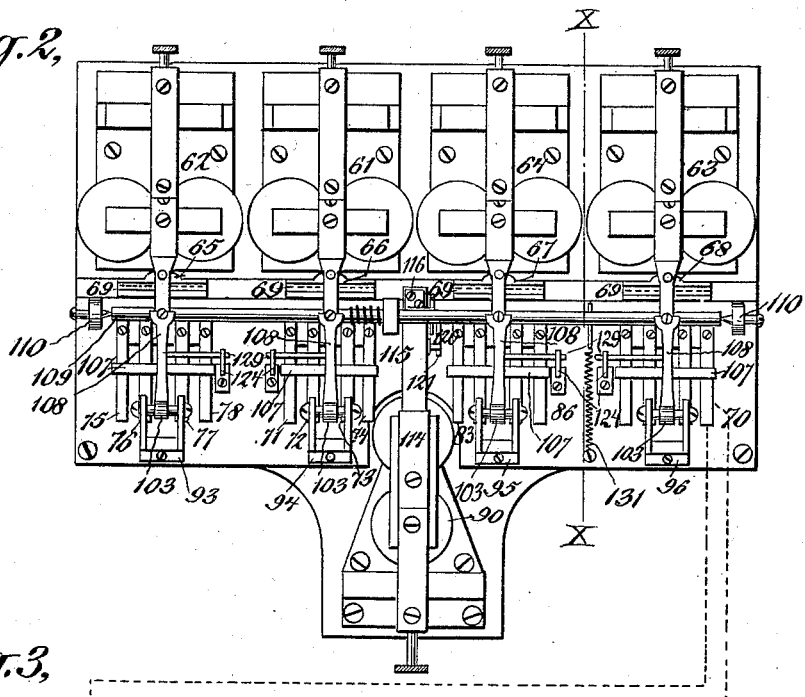
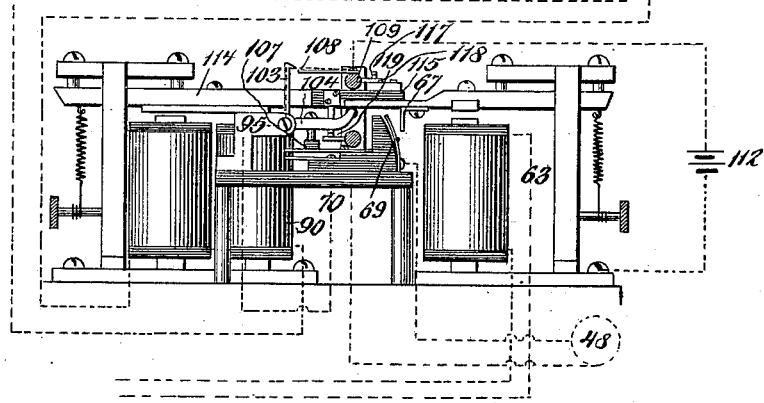
WITNESSES:
George Alexander Cardwell
INVENTOR
BY
HIS ATTORNEY No. 673,315. Patented Apr. 30, 1901.
G. A. CARDWELL.
PRINTING TELEGRAPH.
(Application filed Nov. 18, 1899. Renewed Nov. 14, 1900.)

(No Model.) 10 Sheets—Sheet 3.

WITNESSES:

George Alexander Cardwell
INVENTOR

BY Edwin H Brown
HIS ATTORNEY

No. 673,315. Patented Apr. 30, 1901.
G. A. CARDWELL.
PRINTING TELEGRAPH.
(Application filed Nov. 18, 1899. Renewed Nov. 14, 1900.)

(No Model.) 10 Sheets—Sheet 4.

WITNESSES:

George Alexander Cardwell
INVENTOR

BY Edwin H. Brown
HIS ATTORNEY

No. 673,315. Patented Apr. 30, 1901.
G. A. CARDWELL.
PRINTING TELEGRAPH.
(Application filed Nov. 18, 1899. Renewed Nov. 14, 1900.)

(No Model.) 10 Sheets—Sheet 5.

WITNESSES:

INVENTOR
George Alexander Cardwell
BY Edwin H. Brown
HIS ATTORNEY

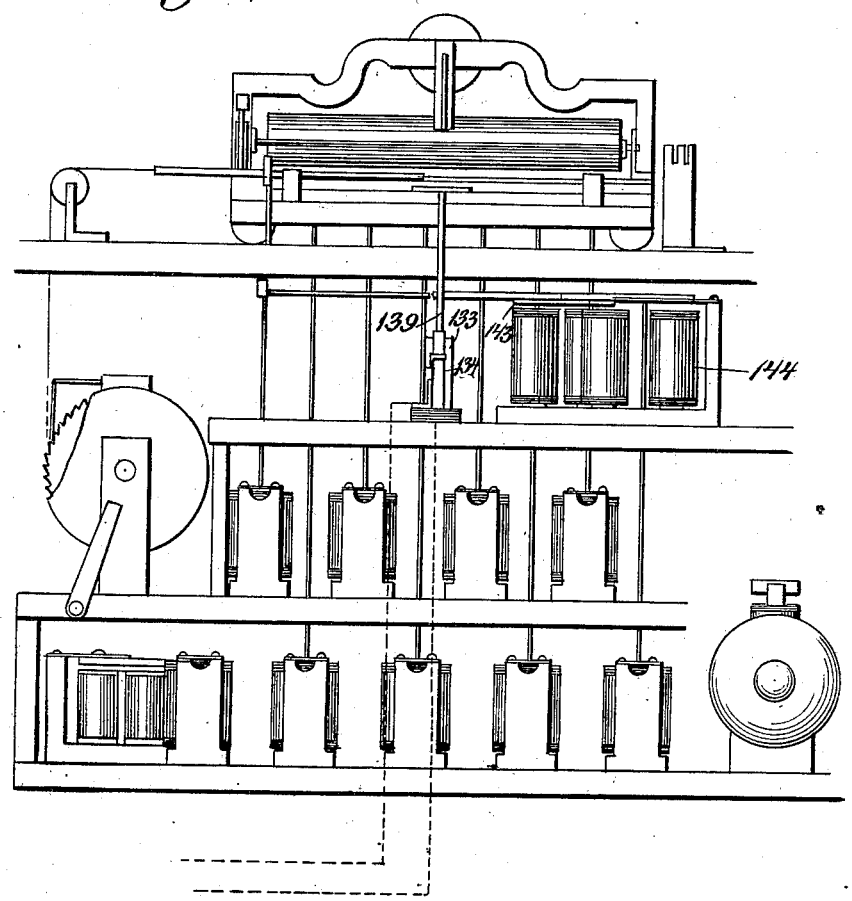

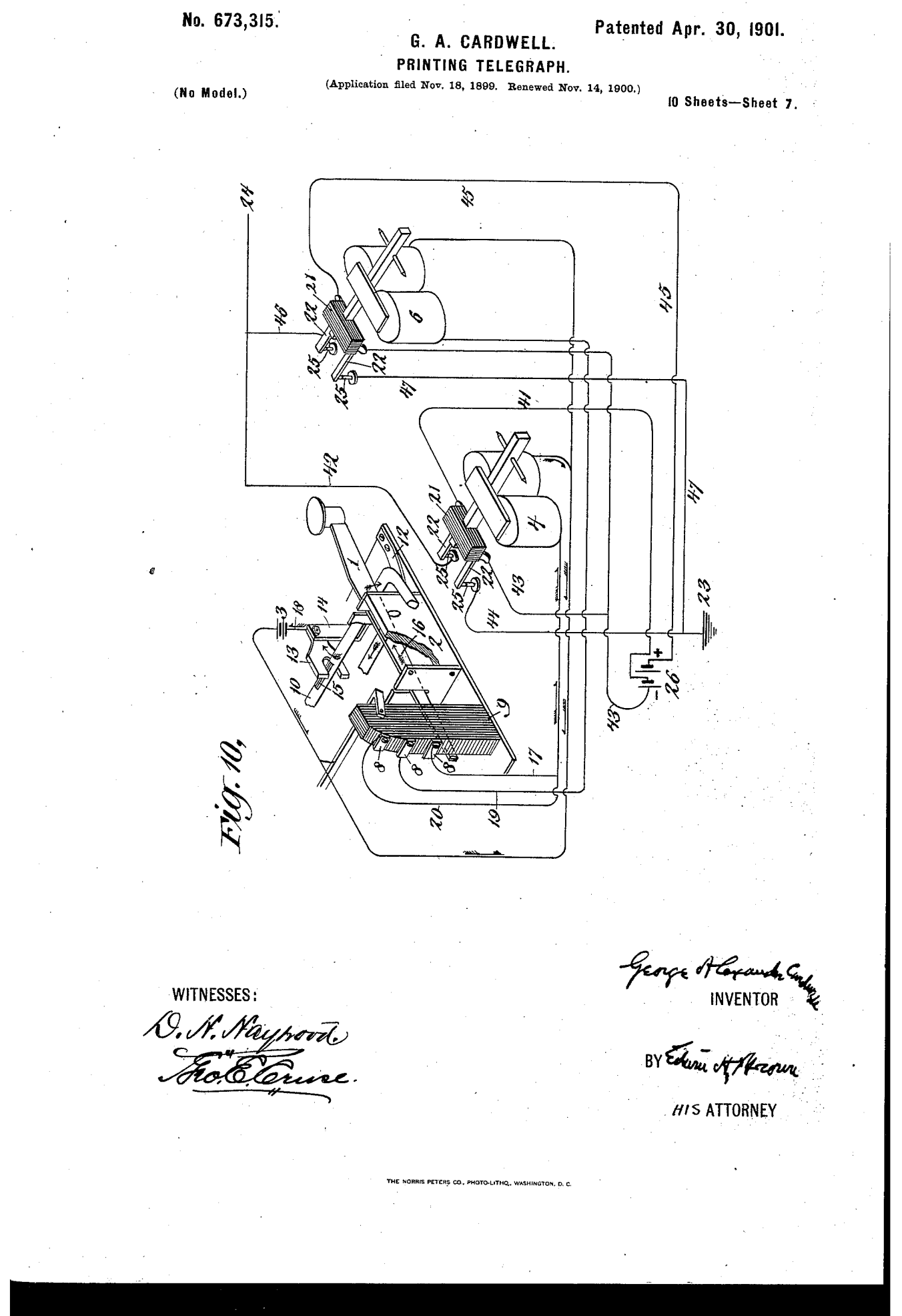

No. 673,315.

Patented Apr. 30, 1901.

G. A. CARDWELL.
PRINTING TELEGRAPH.

(Application filed Nov. 18, 1899. Renewed Nov. 14, 1900.)

(No Model.)

10 Sheets—Sheet 7.

Fig. 10.

WITNESSES:

INVENTOR

BY

HIS ATTORNEY

No. 673,315.

G. A. CARDWELL.
PRINTING TELEGRAPH.

(No Model.) (Application filed Nov. 18, 1899. Renewed Nov. 14, 1900.)

Patented Apr. 30, 1901.

10 Sheets—Sheet 9.

No. 673,315. Patented Apr. 30, 1901.
G. A. CARDWELL.
PRINTING TELEGRAPH.
(Application filed Nov. 18, 1899. Renewed Nov. 14, 1900.)
(No Model.) 10 Sheets—Sheet 10.
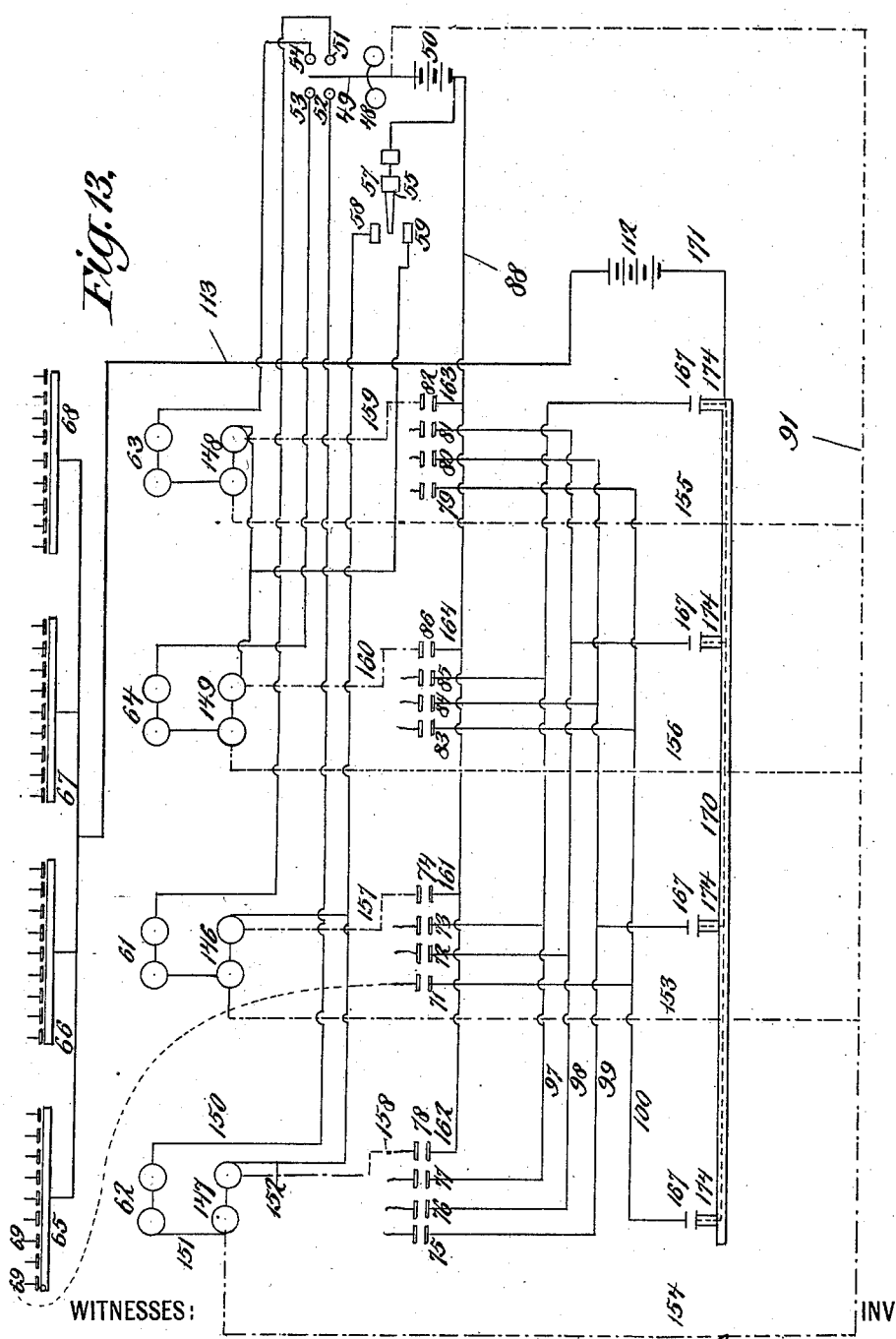
WITNESSES: INVENTOR
George Alexander Cardwell
BY Edwin H. Brown
HIS ATTORNEY

UNITED STATES PATENT OFFICE.

GEORGE ALEXANDER CARDWELL, OF NEW YORK, N. Y., ASSIGNOR TO JOSEPH E. HEIMERDINGER, TRUSTEE, OF SAME PLACE.

PRINTING-TELEGRAPH.

SPECIFICATION forming part of Letters Patent No. 673,315, dated April 30, 1901.

Application filed November 18, 1899. Renewed November 14, 1900. Serial No. 36,513. (No model.)

*To all whom it may concern:*

Be it known that I, GEORGE ALEXANDER CARDWELL, a citizen of the United States, residing in the borough of Manhattan, city, county, and State of New York, have invented certain new and useful Improvements in Printing-Telegraphs, of which the following is a specification.

This invention relates more particularly to an electrical type-writing instrument which can be operated by electrical impulses over a single main-line circuit in such manner as to print letters or other symbols in the proper order to form words and sentences or otherwise to convey intelligence and in which for each letter or symbol a distinctive series of electrical impulses is employed. It also extends to a new or improved transmitting apparatus for putting the appropriate series of electrical impulses to line; also, to a new and improved type-writing telegraph composed of a transmitting apparatus, a main-line circuit, and a type-writer receiver, with appropriate connections, and, further, it includes new or improved means for selecting and operating for any purpose a particular working magnet out of a number of such magnets by impulses over a main-line circuit.

In accordance with said invention use is made at the receiving-station of a number of working magnets in corresponding working circuits or branches, and there are a number of breaks or gaps in said working circuits or branches which are closed by the action of sets of switches operated by selectable magnets that respond to the main-line impulses, each selectable magnet of each set of switches responding to a characteristic kind of impulse and closing breaks or gaps in different working circuits or branches at different points, but not at all points in any one working circuit or branch, and the operation of particular sets of switches in a certain order or sequence, of three at the least, closes all the breaks or gaps of a particular working circuit or branch. The electrical impulses may be distinguished in any desired way; but practically it is most advantageous to utilize differences of strength and polarity. So, also, there may be as many different kinds or characters of impulses as there are sets of switches, and it is considered advantageous to use the four kinds, which consist of a weak positive and a strong positive and a weak negative and a strong negative impulse, since these are capable of absolute differentiation from each other without danger of false signals, while yet the number (four) is enough to enable a sufficient number of printing or working magnets to be selected for a practical industrial result. There may be as many sets of switches (not less than three) as may be desired, and in each set there may be three or more switches or circuit-closers. The switches of any set may be operated by a single selectable magnet or by two or more selectable magnets. The selectable magnets of the switches may be placed in the main-line or in local circuits of selecting magnets or relays in the main line, and where more than one selectable magnet is used to a set of switches one of said magnets may serve as a relay to the others, it being itself placed either in the main-line or in a local circuit of a main-line relay. There may be in the main line (when relays or selecting-magnets are used) a relay for each selectable magnet operating a set of switches; but it is an advantage and a special improvement to employ a main-line relay instrument having its contacts in branches which severally include a selectable magnet or one or more selectable magnets controlling a set of switches. Thus in the form illustrated four kinds of current are used, and these consist of a weak positive current, a strong positive current, a weak negative current, and a strong negative current, and there is a single selectable magnet for each set of switches, and the selecting-magnets in the main line comprise a polarized relay having two contacts on one side connected with two of the selectable magnets, respectively, and two on the other side connected with the other two of the selectable magnets, respectively, and a neutral relay having its back contact connected with two of said selectable magnets and its front contact with another two. With this arrangement a local circuit is completed through the appropriate selectable magnet according to the character of the electrical impulse acting upon the polarized and neutral relays constituting the controlling-magnets. There is a working or printing circuit, shown as having thirty-six branches, and each branch contains a working or printing magnet and not less than three breaks or gaps, but a larger number of breaks or gaps can be utilized without exceeding the limits of the invention. Where, as shown, there are three breaks or gaps in each working circuit and four selectable magnets operating sets of switches controlling the breaks, a particular printing or working magnet can be selected by the operation of a series of three impulses, each unlike in character to any of the other two, and a different printing or working magnet can be selected according to the order in which the same three kinds of impulse are sent. For example, suppose a weak positive, a strong positive, and a weak negative to be the characters of the three kinds of impulse selected. Now a weak positive followed by a strong positive and this by a weak negative will select one working magnet, whereas if the weak positive were followed by a weak negative and this by a strong positive a second working magnet would be selected, and so on for as many permutations as are possible of the said three kinds of impulse. In like manner any three other kinds of impulse could be utilized and a different working magnet selected according to the permutation of the three kinds of current. In this way a large number of working magnets can be selected without repeating any impulse in the series, whereby a particular magnet is selected. By utilizing as a third impulse a repetition of the first of the series of impulses a still larger number of series can be attained. The invention includes, therefore, not only means whereby printing or working magnets are selected by a series of three (or more) impulses unlike in character and in order of sequence, but also by a series of impulses in which the first impulse shall be repeated to form the third impulse of the series.

By utilizing four characters of impulses, as above indicated, and employing series or sequences of three of such impulses to operate each working magnet, in which sequences the third impulse may be a repetition of the first impulse of the sequences, thirty-six working magnets may be employed and any one of them be definitely selected and operated.

In the apparatus shown each set of switches operated by a selectable magnet is provided with a cut-out, whereby the first-operated set of switches, having closed the breaks or gaps belonging thereto, renders it impossible for a certain portion of the breaks or gaps controlled by the other sets of switches to be closed by the succeeding impulses of the same series. Thus, as shown, the whole number of working branches is divided into four groups and only one break or gap belonging to the branches of each group is closed by one of the switches in each set, and on the passage of the first impulse of a series the break or gap in each of the branches of the corresponding group is closed and at the same time the cut-out prevents the subsequent closure of the corresponding break or gap in any of the other three groups. It is necessary, however, that the breaks or gaps of the selected group which have been closed should be held closed, and for this purpose an appropriate detent or lock of suitable description is employed. Each set of switches, therefore, may be said to contain a combined lock-switch and a cut-out. Further, in each set of switches there is a second lock-switch, which remains in the position to which it may be thrown (directly or indirectly) by the appropriate kind of impulse on the main line. The function of this second lock-switch is to select a particular subgroup out of the groups whose primary break or gap has been closed by the first or combined lock-switch and cut-out, and in order that it may do this the branches of the said group are distributed in subgroups among the secondary switches of the sets.

In addition to the combined lock-switch and cut-out and simple lock-switch mentioned each set of switches includes a temporary switch—that is to say, a switch whose contacts are opened on the cessation of the electrical impulse on the main line whereby a set of switches is actuated. Its function is to select a particular member of the subgroup which has been determined by the second lock-switch. Each set of switches therefore comprises two lock-switches, one of which operates as a cut-out, and a temporary switch so arranged that the primary lock-switch and cut-out of only one set can be closed by the series of impulses, while the secondary lock-switch and the temporary switch close subgroups and the individual member belonging to the group closed by the primary lock-switch of the first-actuated set in a series. The detent or lock can be made in various ways. It can be constituted by strictly mechanical or by partly electrical means. So, also, the cut-out can be effected by strictly mechanical or by partly electrical means. In saying the means are "partly electrical" it is only meant to be expressed that some mechanical arrangements are necessary in order that the electric impulse may produce an effect, the action of an armature and the closing of any contacts being in this sense partly electrical, because the motion of the armature or of a contact is of course mechanical when viewed apart from the nature of the force producing the motion.

It will be seen that there are three breaks in each working branch circuit, and all of these breaks must be closed in one working branch circuit to operate the same. The working or printing magnet therein and one or more of the three breaks in the circuits of all the other working or printing magnets must for this time remain open. The character of the first impulse must be such as to operate the particular selectable magnet to simultaneously operate the three switches of the set belonging thereto and to close and hold closed what may be termed the "primary" break in the circuit of the printing-magnet to be operated. To do this, a combined lock-switch and cutout is used, which remains locked until the particular printing-magnet is operated. This lock-switch also performs the function of a cutout in that it is so arranged that all the other lock-switches controlling primary breaks are inoperative, and it is evident that the only printing-magnet circuits that can be completed are those included in the group which passes through this first closed combined lockswitch and cut-out. One of the other switches of the set thus operated by the first impulse and selectable magnet operated thereby is also a lock-switch; but it does not affect any of the printing-magnet circuits passing through the combined lock-switch and cut-out of its set of switches. It does, however, close and hold closed a shunt-circuit controlling the lock of the said combined lock-switch and cut-out. The third switch of the set operated by the first impulse and selectable magnet operated thereby is a temporary switch and does not affect any of the printing-magnet circuits passing through the combined lock-switch and cut-out. The second impulse over the line, which must vary in character from the first, operates another selectable magnet, which also simultaneously operates the set of three switches belonging thereto. The combined lock-switch and cut-out of this set, however, now acts as a temporary switch, as the operations of the first combined lock-switch and cut-out have cut out all the remaining switches of that character and prevents their being locked, and none of the primary breaks of any of the printing-magnet circuits passing through this combined lock-switch and cut-out are held closed thereby. The simple lock-switch of this set is operated and locked, and it closes the secondary break of the particular printing-magnet circuit to be operated and holds it closed. Two of the three breaks in the particular printing-magnet circuit now being closed and locked the next and final impulse of the series operates its selectable magnet. This final impulse must be different in character from the second and preceding impulse, but may or may not be like the first impulse in the series. It temporarily closes the tertiary break in the printing-magnet circuit, so that the printing-magnet may be operated by current from the printing-battery, after which all the switches are restored to their normal positions. If, for instance, there are thirty-six printing-magnet circuits and four selectable magnets each operating its set of three switches, the first selectable magnet operates its combined lock-switch and cut-out to close the primary breaks in a group of nine of the printing-magnet circuits to cut out the remaining combined lock-switches and cutouts. The lock-switch operated by the second selectable switch closes the secondary breaks of three subgroups of three each of the nine printing-magnet circuits closed by the combined lock-switch and cut-out of the first selectable magnet. Each of these three subgroups of printing-magnet circuits thus closed has three branch circuits each including the coils of a printing-magnet and each adapted to have its tertiary or final break closed by a temporary switch; but only one of each group can be closed by any one of the temporary switches, and this closure of the final break determines the particular printing-magnet to be operated.

With this general description of the principles of the invention and with the understanding that these general principles may be variously applied for different purposes and embodied in many and various forms of devices and apparatus without departing from the spirit of the invention a special application thereof embodied in a type-writing telegraph will now be described, reference being had to the annexed drawings, in which—

Figure 5:
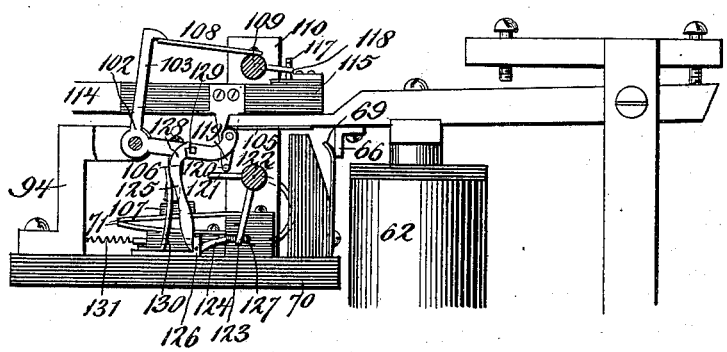
Figure 6:
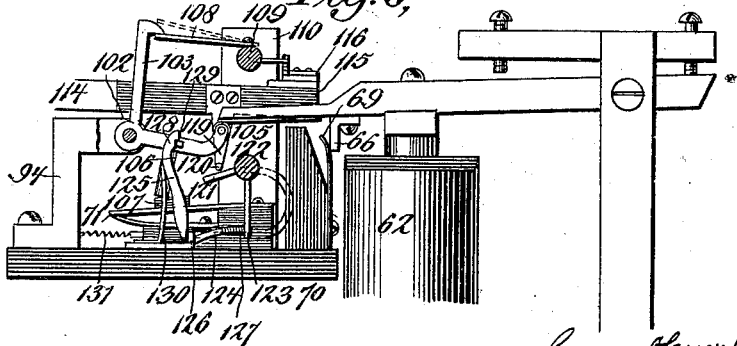
Figure 7:
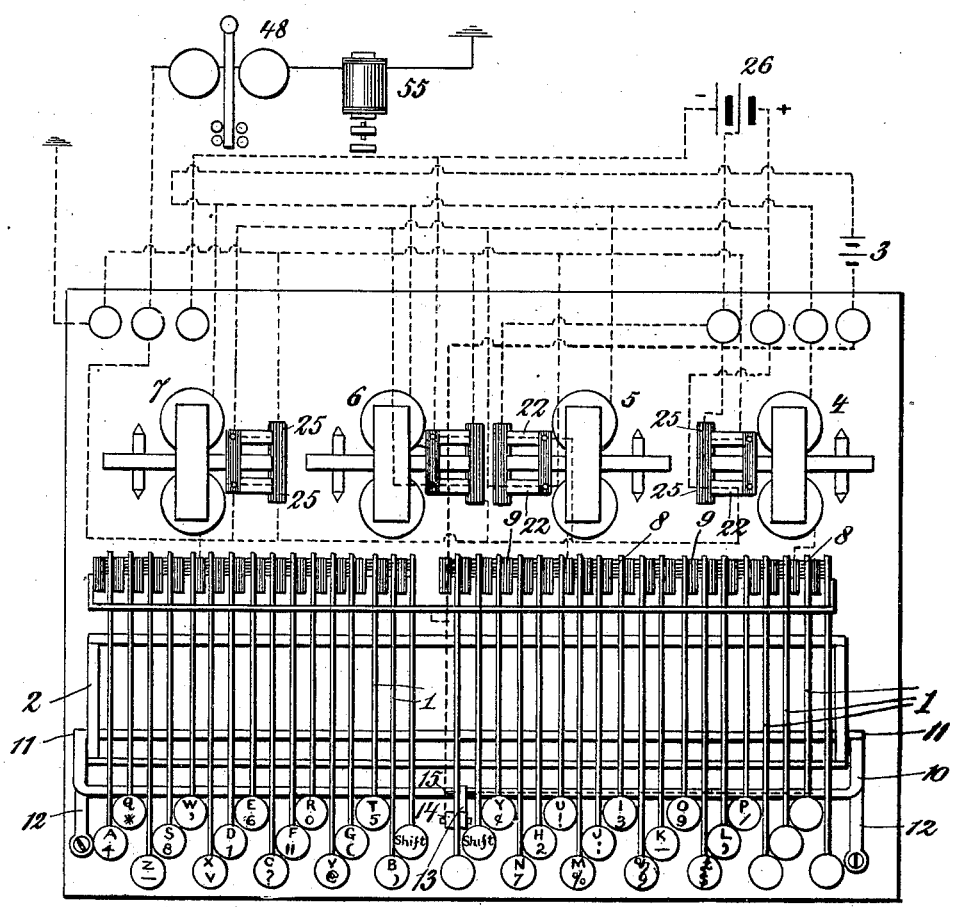
Figure 8:
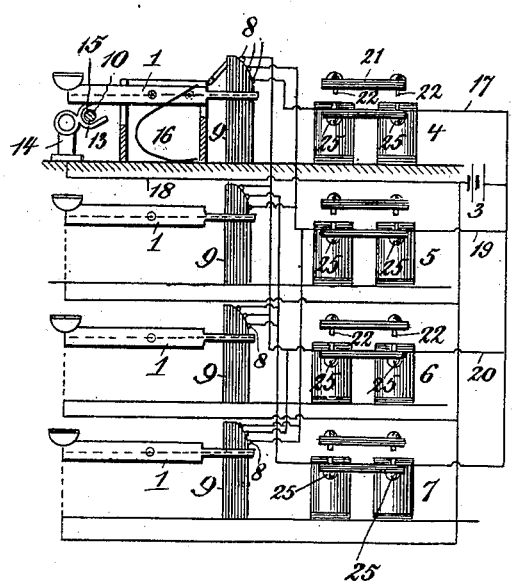
Figure 14:
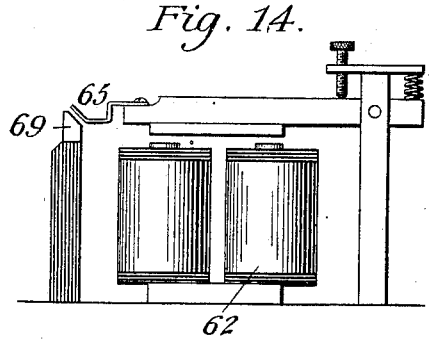
Figure 15:
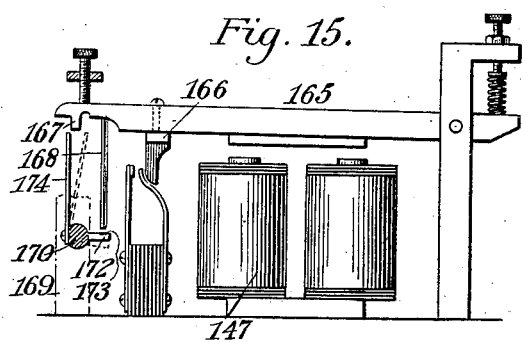
Figure 11:
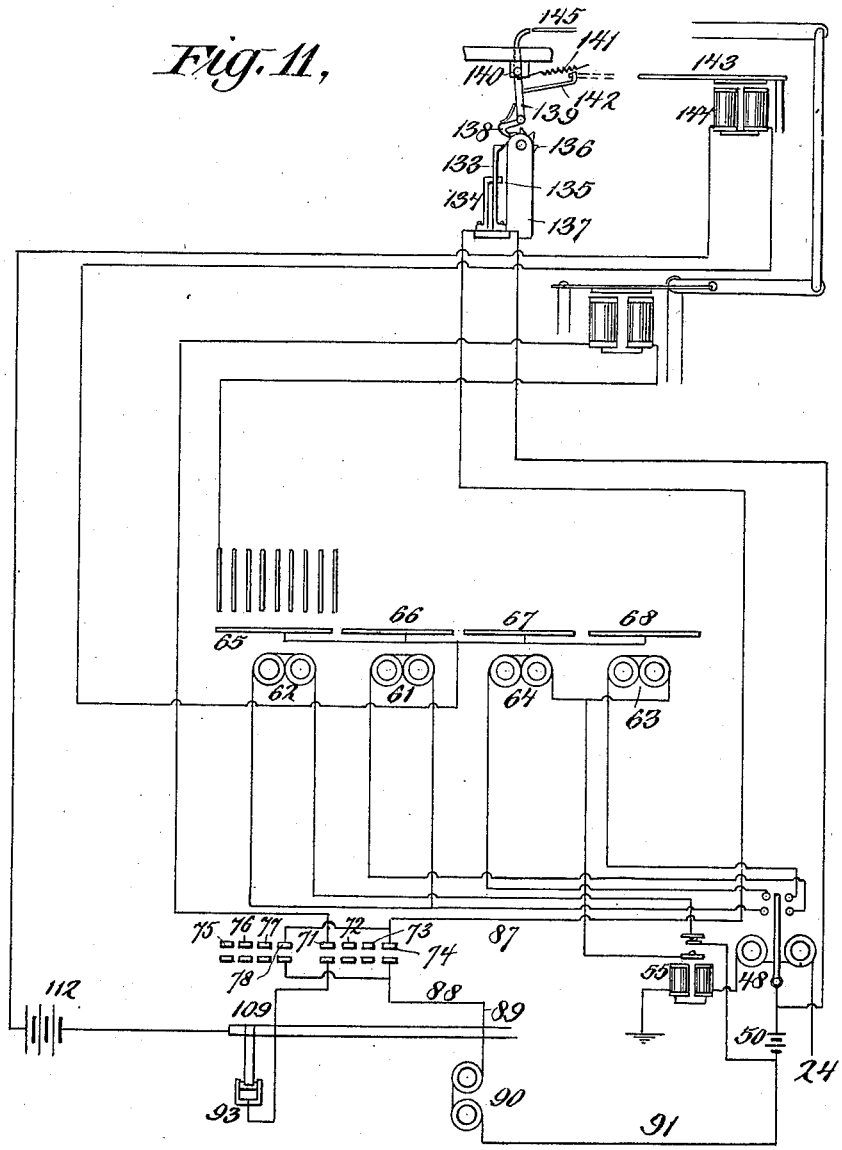
Figure 12:
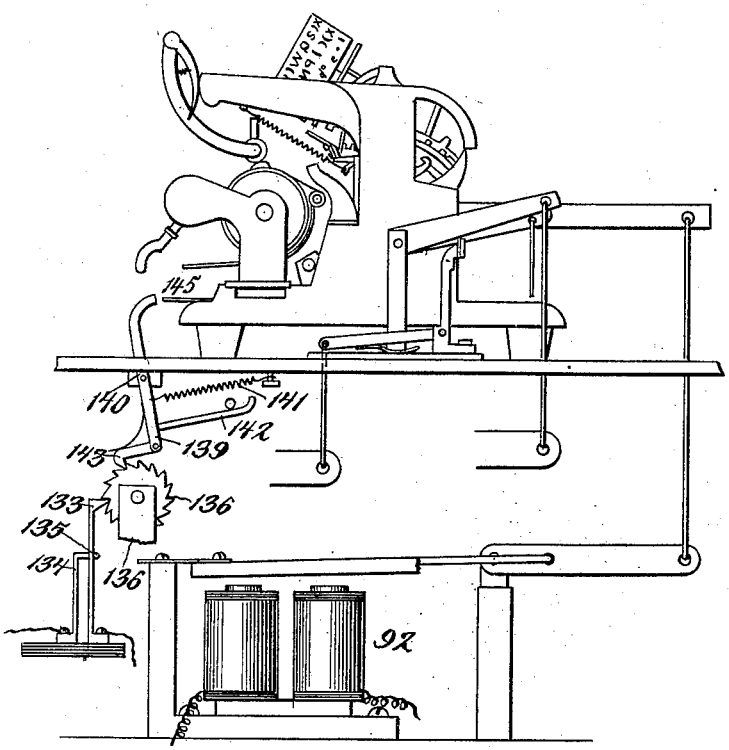

Figure 1 is a diagram of a printing-telegraph. Fig. 2 is a plan view of the circuit selecting and closing device of the receiver. Fig. 3 is a vertical transverse sectional view of the same on the line $xx$ of Fig. 2. Figs. 4, 5, and 6 are vertical transverse sectional views of the circuit selecting and closing device of the receiver, also showing the automatic locking mechanism and the various parts in different positions. Fig. 7 is a plan view of one construction of the transmitter. Fig. 8 is a diagram of part of the transmitter, showing the manner of closing circuits in the same. Fig. 9 is a rear view of one construction of printing mechanism of the receiver. Fig. 10 is a diagrammatic perspective view of one key of the transmitter and certain magnets. Fig. 11 is a diagram of the receiver, showing the circuits through the printing-magnet and circuit-breaker. Fig. 12 is a side view of one construction of printing mechanism of a receiver, the proportion and positions of some parts being more or less arbitrarily represented for the purpose of producing a clear illustration. Fig. 13 is a diagram illustrating another form of the receiver. Fig. 14 is an elevation of certain mechanism comprised in the latter modification. Fig. 15 is another elevation of certain mechanism comprised in said modification.

Similar numerals of reference refer to corresponding parts in all the figures.

In this printing-telegraph is a transmitter, a receiver, and a single line-wire between them. The transmitter is provided with a series of keys 1, which may be supported and move like the keys of a type-writing machine. Each of these keys relates to a letter or other symbol and sends in rapid succession a series of electric impulses (in the present case three) of varying polarity or strength, or both, over the main line into the receiver for the purpose of closing and energizing a desired individual printing-magnet, so that the printing-magnet will be operated to effect the printing of a particular symbol. These keys 1 severally consist of metal levers. (Best shown in Figs. 7 and 8, Fig. 7 showing them as they are actually arranged in the transmitter and Fig. 8 showing them arranged one above the other for the purpose of furnishing a clear and comprehensive diagram.) They are all journaled in a frame 2. The keys 1 complete the circuit of the local battery 3 to energize four electro magnets 4, 5, 6, and 7, also well shown in Fig. 7.

Each key 1 is made in the form of a lever and at the inner end will move upward over and coact with three metal contacts 8 whenever the outer end is depressed by a finger. The three contacts 8 for each key are mounted on standards 9, of insulating material, there being one standard 9 for each key 1. The contacts 8 of each of the keys on the keyboard are connected by wires with two or three of the four magnets 4, 5, 6, and 7 in such manner that when any one key is depressed and its inner end coacts with its set of three contacts 8 the circuits of three out of the four magnets 4, 5, 6, and 7 will be closed successively or the circuits of two out of the four magnets will be closed, first as to one of such magnets, then as to a second of such magnets, and again as to the first of such magnets. In either case each coaction of a key with its three contacts 8 produces three electrical conditions successively different, and hence capable of bringing about three successively different electrical effects. The keys 1 all rest upon a rocking metal bar 10, fulcrumed at 11 in the frame 2. This bar is pressed upward by springs 12 and is embraced by a fork 13, pivoted on the post 14 and connected with the local battery 3. The upper prong of the fork 13 normally bears on a piece 15 of insulating material with which said bar 10 is provided; but the lower prong of the fork is normally some distance below said bar and out of contact with the same. Whenever a key 1 is depressed, the bar 10 is forced down and by coming in contact with the lower prong of the fork 13 closes the circuit of the local battery 3 for the depressed key. For the purpose of illustration a description will be given of the circuits belonging to the uppermost key in Fig. 8, where the parts are shown in their normal positions. When the key 1 returns to its normal position under the influence of spring 16, the bar 10 follows under the influence of spring 12 and the insulating material 15 bears on the upper prong of fork 13, and the circuit is broken, so no impulses are transmitted. When the outer end of said uppermost key 1 is depressed, its inner end, moving upwardly, first coacts with the lowest contact 8, which is the first of the three with which such key is to coact. Thus will be closed the circuit from the local battery 3 through the magnet 4, the wire 17, the lowest of said three contacts 8, the said key 1, the bar 10, the lower prong of the fork 13, the post 14, and the return-wire 18. Next the inner end of said key 1 in its continued upward movement sweeps over the second contact 8, thus closing the circuit through the local battery 3, the magnet 5, the wire 19, the said second contact 8, the said key 1, and returning from the latter to the local battery 3, as before, through the wire 18. Next the inner end of said key 1 in its continued upward movement coacts with the third contact 8. Thus the circuit is completed through the local battery 3, the magnet 6, the wire 20, the said third contact 8, the said key 1, returning to the battery, as before, through the wire 18.

It must be understood that the complete movement of the key 1 under consideration and its coaction successively with its three contacts 8 caused the three magnets 4, 5, and 6 to be separately and successively energized. The purpose of this operation is to produce three successively different electrical impulses over the main line to a distant receiver, where a message is to be received. The three electrical impulses resulting from the manipulation of each key 1 are to be different in order or character from the combination of three electrical impulses obtainable through the manipulation of any other key 1. In other words, each key 1 is to be characterized by a distinct combination of three electrical impulses, and such distinctive combination of three electrical impulses is adapted for producing a symbol or its equivalent.

Now will be given an explanation of the manner in which the three successive different electrical impulses by the key under consideration—namely, the uppermost key 1 of Fig. 8—are produced.

The armature of each of the magnets 4, 5, 6, and 7 carries a plate 21 of insulating material, having two contacts 22, of which one is connected by wires with the earth-line 23 and the other with the main line 24. (See Fig. 1.) These two contacts 22 can be moved against two contacts 25, which are connected with the positive and negative poles, respectively, of the main-line battery 26, as shown in diagram, Fig. 1. In place of connecting the contacts 22 and contacts 25 as shown in Fig. 1 such connections may be reversed and the contacts 25 connected with the main line 24 and earth-line 23, respectively, and the contacts 22 connected with the positive and negative poles, respectively, of the main-line battery 26, as shown in Fig. 10. In each example of these two examples of the invention the connections with the main-line battery 26 are made in such a manner that the whole or only a part of said battery may be included in the circuit. It will be seen that in Fig. 1 the wire 27 is connected with one of the intermediate negative elements of that battery, so that the circuit will be through part of said battery only. When only part of the main-line battery 26 is used, a weaker current impulse will be sent through the main line and hereinafter will be referred to as a "weak" impulse, and the current impulse from the full battery will be referred to as a "strong" impulse. When, for example, the magnet 4 in Fig. 8 is energized, the circuit of the main-line battery 26 is closed by bringing together those two pairs of the contacts 22 and 25 corresponding to the magnet 4, whereupon the main-line circuit will be (see Fig. 1) from the intermediate negative element of the main-line battery 26 through the wire 27, through the wire 28, through the right-hand contact 25 and the opposite contact 22 of the magnet 4 to the earth-line 23, and from the positive terminal of the main-line battery 26 through the wire 29, through the left-hand contact 25 and the opposite contact 22 of the magnet 4 to the main line 24. Thus a weak positive impulse is sent through the main line 24 whenever the magnet 4 is energized. This will happen whenever any key 1 sweeps over a contact 8, connected with the magnet 4. When, for example, a key 1 sweeps over a contact 8 connected with the magnet 5 and the latter is thus energized, the circuit will be closed from the intermediate negative element of the main-line battery 26 through the wire 27, through the right-hand contact 25 and the opposite contact 22 of the magnet 5, and through the wire 30 to the main line 24, and from the positive terminal of the main-line battery 26 through the wires 31 and 32 and through the left-hand contact 25 and opposite contact 22 of the magnet 5 to the earth-line 23. Thus a weak negative impulse is sent through the main line 24. When, for example, a key 1 sweeps over a contact 8 connected with the magnet 6 and the latter is thus energized, the circuit will be closed from the positive terminal of the main-line battery 26 through the wire 33, through the left-hand contact 25 and opposite contact 22 of the magnet 6, and through the wire 34 to the main line 24, and from the negative terminal of the main-line battery 26 through the wire 35, through the right-hand contact 25 and opposite contact 22 of the magnet 6, and through the wire 36 to the earth-line 23. Thus a strong positive impulse is sent through the main line 24. When, for example, a key 1 sweeps over a contact 8 connected with the magnet 7 and the latter is thus energized, the circuit will be closed from the negative terminal of the main-line battery 26 through the wire 37, through the left-hand contact 25 and opposite contact 22 of the magnet 7, and through the wire 38 to the main line 24, and from the positive terminal of the main-line battery 26 through the wire 39, through the right-hand contact 25 and opposite contact 22 of the magnet 7, and through the wire 40 to the earth-line 23. Thus a strong negative impulse is sent over the main line 24. With the connections of the main line 24, earth-line 23, and contacts 25 and contacts 22, as shown in Fig. 10, the key 1, sweeping over the lowest contact 8, which is connected with the magnet 4, will close the circuit from an intermediate positive element of the main-line battery 26 through the wire 41, through one contact 22 of the magnet 4 and the opposite contact 25, and through the wire 42 to the main line 24, and from the negative terminal of the main-line battery 26 through the wire 43, through the other contact 22 of the magnet 4 and the opposite contact 25, and through the wire 44 to the earth-line 23. Thus a weak positive impulse will be sent through the main line. When the key 1, Fig. 10, sweeps over its second or middle contact 8, which is connected with the magnet 6, the circuit will be closed from the positive terminal of the main-line battery 26 through the wire 45, through one contact 22 of the magnet 6 and the opposite contact 25, and through the wire 46 to the main line 24, and from the negative terminal of the main-line battery 26 through the wire 43, through the other contact 22 of the magnet 6 and the opposite contact 25, and through the wire 47 to the earth-line 23. Thus a strong positive impulse will be sent through the main line. When the key 1, Fig. 10, sweeps over the uppermost contact 8, which, like the lower contact 8, is connected with the magnet 4, the circuit will be closed in the same manner as described above for the lowest contact 8, and a weak positive impulse will be sent through the main line again. It will thus be clear that by making suitable combinations of the contacts 8 for the several keys 1 it will be possible to send weak negative or positive impulses or strong negative or positive impulses through the main line in any desired order and to utilize this varying order of different impulses for producing different effects in the distant receiver or for the purpose of closing any desired printing-circuit in such receiver. Other forms may be employed for the purpose of sending impulses of successively-varying effect over the main line—as, for instance, a well-known automatic transmitter utilizing a perforated slip.

To understand the receiving apparatus located at the place where the message is to be given, reference should be made specially to the diagram, Fig. 1, and for a comprehension of it one must remember that the transmitter may send along the main line a strong positive current or a strong negative current or a weak positive current or a weak negative current. It will be seen that the main line 24 extends to an electromagnet 48. This is a polarized relay-electromagnet, and with it is combined an armature 49, capable of moving under impulses from the polarized magnet in one direction or the other, according to the polarity of the current impulses passing along the main line 24. The armature 49 is in electrical communication with one terminal of a local battery 50. The armature 49 coacts with contacts 51, 52, 53, and 54, which are arranged in pairs, so that when said armature is moved in one direction—as, for example, to the left—it will continue the circuit from the local battery 50 to the contacts 51 and 52, and if moved in the opposite direction—as, for example, to the right—it will continue the circuit from the local battery 50 to the contacts 53 and 54. For reasons presently to be given the current impulses will, however, flow through only one of the four contacts 51, 52, 53, and 54 at a time. The main-line circuit is continued from the polarized magnet 48 to a neutral or non-polarized relay-electromagnet 55 and thence to the ground 56. With the neutral magnet 55 is combined an armature 57, coacting with two contacts or stops 58 and 59. When this neutral magnet is energized sufficiently to attract its armature, it will move its armature on to the contact 59; but while insufficiently energized to attract its armature a spring will hold the armature upon the contact 58. That terminal of the local battery 50 which is not connected with the armature 49 of the polarized magnet 48 is connected by a wire 60 with the armature 57 of the neutral magnet 55. It will therefore be seen that in order to complete the circuit included in the local battery 50 it will be necessary for the armature 49 of the polarized magnet 48 to make electrical communication with one of the contacts 51, 52, 53, and 54 and for the armature 57 of the neutral magnet 55 to coact with one of the contacts 58 and 59. It is the purpose of these two magnets 48 55 to select different circuits, according to the current impulses transmitted through the main line, and for convenience these magnets will be termed the "selecting" magnets. To make their operation clear, it may be added that a weak positive current will cause the polarized magnet 48 to move its armature 49 in one direction—for example, to the left—without causing the neutral magnet 55 to attract its armature 57, that a weak negative current will cause the polarized magnet 48 to move its armature 49 in the opposite direction without causing the neutral magnet 55 to attract its armature 57, that a strong positive current will cause the polarized magnet 48 to move its armature 49 in one direction—for example, to the left—and, additionally, will cause the neutral magnet 55 to move its armature 57 away from the contact 58 and onto the contact 59, and that a strong negative current will cause the polarized magnet 48 to move its armature 49 in the opposite direction and, additionally, will cause the neutral magnet 55 to move its armature 57 away from the contact 58 and onto the contact 59.

61, 62, 63, and 64 are electromagnets, which may be termed "selectable" magnets, because they will be separately selected by the selecting-magnets 48 55 and included in an operative circuit, such circuit in this example of the invention being the circuit of the local battery 50, so as to be energized thereby. Their selection by the selecting-magnets is in correspondence with the kind of current transmitted along the main line 24 from the distant transmitter, whence the message is sent. Before describing the manner in which the selectable magnets 61, 62, 63, and 64 will be separately included in the circuit of the local battery 50 it may be well to add that these selectable magnets 61 and 62 are the only ones capable of being selected by the polarized magnet 48 alone, and consequently the only ones capable of being brought into the circuit of the local battery 50 by weak current impulses transmitted along the main line, one of these two selectable magnets 61 and 62 being brought into the circuit of the local battery 50 by a weak positive current impulse and the other by a weak negative impulse. It will be assumed that the circuit of the local battery 50 will be completed through these selectable magnets by a weak positive current for 61 and a weak negative current for 62 over the main line. Further, it may with advantage be here stated that the selectable magnets 63 and 64 are the only ones capable of being selected by the polarized magnet 48 and the neutral magnet 55 operating together, and consequently the only ones capable of being brought into the circuit of the local battery 50 by strong current impulses transmitted along the main line, one of these two selectable magnets 63 64 being brought into the circuit of the local battery 50 by a strong positive current impulse and the other by a strong negative impulse. It will be assumed that the circuit of the local battery 50 will be completed through the selectable magnet 63 by a strong positive current over the main line and through the selectable magnet 64 by a strong negative current.

Now will be described the circuit connections between the contacts 51, 52, 53, and 54, the selectable magnets 61, 62, 63, and 64, and the contacts 58 and 59.

From the contact 54 of the polarized magnet 48 a wire extends to the weak positive selectable magnet 61, and from the latter a wire extends to the contact 58 of the neutral magnet 55. From the contact 52 of the polarized magnet 48 a wire extends to the weak negative selectable magnet 62, and the latter is connected with the wire before mentioned as extending to the contact 58 of the neutral magnet 55. From the contact 53 of the polarized magnet 48 a wire extends to the strong positive selectable magnet 63, and from the latter a wire extends to the contact 59 of the neutral magnet 55. From the contact 51 of the polarized magnet 48 a wire extends to the strong negative selectable magnet 64, and the latter is connected with the wire already mentioned as extending to the contact 59 of the neutral magnet 55.

With each of the selectable magnets 61, 62, 63, and 64 is combined an armature, which may be mounted in the usual way, as shown in Fig. 3. Each of these armatures is affixed to and operates a metal bar. 65, 66, 67, and 68 designate these bars. Opposite each of these bars a set of nine metallic springs 69 is secured on a piece 70 of insulating material. Against these nine springs the opposite bar 65 or 66 or 67 or 68 is pressed when the armature carrying the said bar is attracted by its selectable magnet.

For each of the selectable magnets 61, 62, 63, and 64 there is a group of four pairs of spring tongues or contacts, those for the selectable magnet 61 being marked 71, 72, 73, 74, those for the selectable magnet 62 being marked 75, 76, 77, and 78, those for the selectable magnet 63 being marked 79, 80, 81, and 82, and those for the selectable magnet 64 being marked 83, 84, 85, and 86, as may be best understood by reference to Figs. 1, 3, 4, 5, and 6. Each of the groups of contacts just described has one pair of its contacts connected with a shunt-line comprised in the circuit of the local battery 50. Those pairs of contacts which are connected with such shunt-line are 78, 74, 86, and 82. This shunt-line comprises a wire 87, leading from one terminal of the local battery 50 to a contact of each of the pairs 78 or 74 or 86 or 82. The opposite contacts in these pairs are connected to a wire 88, which is connected by a wire 89 with an electromagnet 90, and the latter is also connected by a wire 91 with the other terminal of said local battery 50. The magnet 90 is thus included in the shunt-circuit. Whenever the pair of contacts 78 in the group 75, 76, 77, and 78, or 74 in the group 71, 72, 73, and 74, or 86 in the group 83, 84, 85, and 86, or 82 in the group 79, 80, 81, and 82 are brought together, the circuit of the shunt-circuit 87, 88, 89, and 91 will be completed from the local battery 50 through the magnet 90. Then the magnet 90 will be energized for a purpose that will appear later on. Passing for the present from a consideration of the pairs of contacts 78, 74, 86, and 82 to the other pairs of contacts 75, 76, 77, and 71, 72, 73, and 83, 84, 85, and 79, 80, 81 in said groups, it will be seen that one contact of each of these pairs is connected by a wire with three printing-magnets 92. There is one of these printing-magnets for each of the springs 69, and consequently there are thirty-six printing-magnets in all. To avoid any misunderstanding, it will be added that there is only one of the springs 69 for each printing-magnet, and, conversely, there is one printing-magnet for each of said springs. As one printing-magnet is connected with only one of the springs 69 and nine springs 69 are opposite each bar 65 or 66 or 67 or 68, it may be said that the entire number of printing-magnets 92 are arranged in four sets of nine in each set.

Not only do the selectable magnets 61, 62, 63, and 64 cause the bars 65, 66, 67, and 68 to move against their opposite sets of nine metallic springs, but said selectable magnets also move together the pairs of contacts in the groups 75 76 77 78 and 71 72 73 74 and 83 84 85 86 and 79 80 81 82. The selectable magnet 61 thus moves together the pairs of contacts 71 72 73 74, the selectable magnet 62 thus moves together the pairs of contacts 75, 76, 77, and 78, the selectable magnet 63 thus moves together the pairs of contacts 79 80 81 82, and the selectable magnet 64 thus moves together the pairs of contacts 83 84 85 86. For convenience of explanation reference may be made to the opposite contacts in the pairs 75 76 77 78 and 71 72 73 74 and 83 84 85 86 and 79 80 81 82 as "upper" and "lower" contacts, these being shown in Figs. 1 and 3. Each of the upper contacts 75 76 77 78 and 71 72 73 74 and 83 84 85 86 and 79 80 81 82 is connected with three printing-magnets 92, and these three printing-magnets are in different sets of the four sets of nine, as previously stated. Besides operating the bars 65 66 67 68 and the contacts 75 76 77 78 and 71 72 73 74 and 83 84 85 86 and 79 80 81 82 the armatures of the selectable magnets 61 62 63 64 will effect the operation of switches 93 94 95 96. The three lower contacts 75 76 77 and 71 72 73 and 83 84 85 79 80 81 are connected with four wires 97 98 99 100 in such a manner that three of the said lower contacts, each in a different one of the four groups of three contacts each, are connected with one of the four wires 97 98 99 100. Each wire 97 98 99 100 is connected with a separate L-shaped metal piece 101 of one of the switches 93 94 95 96, which pieces 101 are secured on the piece of insulating material 70. On each of the four pieces 101 an L-shaped detent-lever 102 is pivoted, each such lever having an upwardly-projecting hook-detent 103, which constitutes a contact, and an arm 104, extending under the armature of the corresponding selectable magnet 61 or 62 or 63 or 64, and on the free end of each arm 104 is mounted a small roller, which rests against an insulating-plate 105 on the under side of the corresponding armature above it. From the under side of each arm 104 a pin or arm 106 extends downward and rests freely upon a transverse bar 107 of insulating material, which is attached to the upper four spring-contacts 75 76 77 78 or 71 72 73 74 or 83 84 85 86 or 79 80 81 82 directly below it and attached to the piece of insulating material 70, so that when the corresponding armature is attracted the arm 104 is pressed down and by means of its pin 106 and bar 107 presses the corresponding four upper contacts against the lower contacts.

Opposite each detent-contact 103 of each L-shaped detent-lever 102, of which there are four, a spring-tongue 108 projects toward the detent-contact 103 from a metal rock-shaft 109, journaled in insulated standards 110. Each of these spring-tongues can be engaged by its corresponding detent-contact 103. The rock-shaft 109 is connected by a wire 111 with one terminal of the local printing-battery 112, which has its opposite terminal connected by the wire 113 with the four bars 65 66 67 68 on the armatures of the four selectable magnets 61 62 63 64, as shown in Fig. 1.

The magnet 90 has an armature 114, mounted in the usual manner and provided at its free end, on the upper surface, with a plate 115 of insulating material. The armature 114 of the magnet 90 carries on its upper surface, at the free insulating end, a plate 116, having a slotted tongue 117, into which a pin 118 projects radially from the rock-shaft 109. When the armature 114 is moved downward, the slotted tongue 117 coacts with the pin 118 to correspondingly move the latter, so as to turn the rock-shaft 109 axially, whereby all the contacts 108, excepting the one that has been engaged by its detent-contact 103, are swung upward and out of the path of the detent-contacts 103 opposite them. This is to prevent the formation of a multiplicity of circuits when any other selectable magnet is subsequently energized. To one side of the free end of the armature 114 of the magnet 90, Figs. 4, 5, and 6, a downwardly-extending arm 119 is attached, and from the latter an arm 120 extends laterally. When the armature 114 is moved downward, this arm 120 can press down an arm 121, projecting radially from a rock-shaft 122, also mounted on the insulated standards 110, and thus turn said rock-shaft 122 axially. This rock-shaft 122 extends over the piece of insulating material 70, and at each selectable magnet 61 or 62 or 63 or 64 is provided with a downwardly-projecting arm 123, bent laterally at its lower end to extend underneath the lower limb 124 of a pivoted L-shaped lever 125, fulcrumed at 126, and of which there is one for each of the selectable magnets 61 62 63 64. Each lower limb 124 has an insulating-piece 127 on the end when it is engaged by the arm 123. The upwardly-extending member of each L-shaped lever 125 has its upper end shaped as a hooked portion 128 to adapt it to engage and hold a pin 129, extending laterally from the arm 104, corresponding to the same selectable magnet 61 or 62 or 63 or 64 to which such L-shaped lever 125 pertains. A spring 130, bearing against the upwardly-extending member of each L-shaped lever 125 presses the upper end of said lever toward and against the laterally-extending pin 129 of the corresponding arm 104, as shown in Figs. 4 and 5; but these springs 130 cannot act as long as the L-shaped levers 125 are held by the bent ends of the corresponding arms 123.

A spring 131 is attached to any stationary part of the receiver—as, for example, the piece of insulating material 70—and to one of the arms 123 of the rock-shaft 122. This spring 131 is stronger than all four springs 130 combined, and consequently is able to move the four L-shaped levers 125 in the reverse direction of that in which said levers would be moved by the springs 130 when the latter are permitted to operate. When the armature 114 of the magnet 90 is attracted and moved downward, the arm 120 bears down on the arm 121 of the rock-shaft 122 and turns the latter sufficiently to overcome the tension of the spring 131 and swing the four arms 123 of said rock-shaft 122 to the right (see Figs. 4, 5, and 6) to such an extent that the insulating-pieces 127 of the lower limbs 124 of the four L-shaped levers 125 can be swung downward under the action of the springs 130, whereby the hooked upper portions 128 of the upright limbs of the four L-shaped levers 125 can be moved against the pins 129 of the arms 104 of the four L-shaped detent-levers 102. As long as any such arm 104 is in raised position, as in Fig. 4, that part of the upper end of the L-shaped lever 125 above the hooked portion 128 rests against the corresponding pin 129 without locking said pin and the arm 104, carrying it; but if the arm has been previously—that is, an instant before—depressed by the armature of a selectable magnet 61 or 62 or 63 or 64 the hooked portion 128 of the corresponding L-shaped lever 125 snaps over the pin 129 of said arm 104 and locks it, thereby locking the arm 104 in lowered position and also locking the four upper contacts 75 76 77 78 or 71 72 73 74 or 83 84 85 86 or 79 80 81 82, upon which it can act in lowered position—that is, in contact with the corresponding lower contacts. If subsequently the arm 104 pertaining to any other one of the four selectable magnets is depressed by the armature of the selectable magnet above it, the corresponding L-shaped lever 125 snaps forward as soon as the pin 129 on said arm 104 has passed under the hooked portion 128, and thus said arm 104 and the four pairs of contacts 75 76 77 78 or 71 72 73 74 or 83 84 85 86 or 79 80 81 82 below it are also locked in closed position.

It must be understood that as soon as the first selectable magnet 61 or 62 or 63 or 64 is energized the arm 104 of the corresponding L-shaped detent-lever 102 is depressed and the contacts 75 76 77 78 or 71 72 73 74 or 83 84 85 86 or 79 80 81 82 adjacent to it are locked in closed position, and thus the shunt-line in which the magnet 90 is included remains closed, the magnet 90 remains energized, and the armature 114 remains in lowered position until the shunt-circuit is broken, and thus the arm 104 of the L-shaped detent-lever 102 that has been depressed and the spring-contacts adjacent thereto are held in locked position until the shunt-circuit is broken.

The shunt-circuit 87 88 89 91 is continued through two spring-contacts 133 134, Fig. 11, on an insulated plate. The contact 134 is rigid and has a lateral arm 135, against which the contact 133 is pressed by its spring tension, and this contact 133 terminates in a tooth resting on the rim of a ratchet-wheel 136, mounted in a standard 137. This ratchet-wheel is engaged by a spring-pawl 138 on a lever 139, pivoted at 140 and influenced by a spring 141. An arm 142 of the lever 139 is connected with an extension of the armature 143 of an electromagnet 144, which is in the circuit of the local printing-battery 112, and this magnet 144 becomes energized every time the circuit of the printing-battery is closed, or, in other words, every time an impression is made. As the armature 143 of the magnet 144 is attracted it swings the lever 139 to the left, causing the pawl 138 to engage a tooth of the ratchet-wheel 136.

When the printing-circuit is broken by the breaking of the circuit of the corresponding selectable magnet and the raising of the armature of said selectable magnet by its spring, the spring 141 swings the lever 139 to the right, and the ratchet-wheel 136 is turned one tooth, whereby the contact 133 is momentarily moved from the contact 134, and thus the shunt-circuit is broken. The armature 114 is then at once withdrawn by its spring from the magnet 90, and the arm 119 of this armature 114 no longer presses on the arm 121. The spring 131 now pulls the arm 123 with which it is connected outward, and the several arms 123 on the rock-shaft 122 swing the several L-shaped levers 125 upward, whereby the shouldered upper ends of the L-shaped levers 125 are swung away from the pins 129 of the several arms 104 of the L-shaped detent-levers 102, which they held locked, thus permitting the upper contacts 75 76 77 78 or 71 72 73 74 or 83 84 85 86 or 79 80 81 82, which were depressed by a bar 107 above them, to snap upward and to raise the corresponding arm 104. Thus all parts are restored to their original positions, and the next letter can be printed in the same manner, and so on. When the printing-circuit is broken in the manner set forth and the lever 139 is thrown to the left, the pawl 138 engages a fresh tooth of the ratchet-wheel and the upper end of the lever 139 strikes against a plate 145, which shifts the dog of a paper-shifting rack of any well-known construction sufficiently to permit the paper-holder of the type-writing mechanism of the receiver to move lengthwise the distance of a letter or space.

For illustration of the entire operation it will be assumed that the letter "A" is to be printed. For this a negative weak impulse will first be sent over the main line by depressing the proper key 1 of the transmitter. The armature 49 of the polarized magnet 48 will be thereby swung to the left and against the contact 52. A current from the local battery 50 will thus be made to pass from the contact 52, through the first selectable magnet 62, from the latter through the return-wire to the contact 58 of the neutral magnet 55, into the armature 57 of this neutral magnet, and through the wire 60 to the local battery 50. In this manner the armature of the first selectable magnet 62 will be attracted and its bar 65 brought into contact with the corresponding nine springs 69, making a temporary closure of the breaks at the springs, but without completing the printing-circuits, because there are other breaks in each of the nine printing-lines connected with the said springs 69. At the same time the corresponding arm 104 will be moved down by said armature, and the detent-contact 103 of the selectable magnet 62 will be thereby moved so as to engage its contact 108, whereby the local printing-battery 112 will be brought into the circuit of the wire 100. At the same time by the closing of the contacts 78 corresponding to the selectable magnet 62 the shunt-circuit 87 88 89 91, in which the magnet 90 is located, will be closed. The armature 114 of this magnet 90 is attracted, and by means of the arm 106 and the arms 123 of the rock-shaft 122 the arm 104 which has been pressed down by the attracting of the armature of the selectable magnet 62 and has closed the pairs of contacts 75 76 77 78, is locked in lowered position—that is to say, the four pairs of contacts 75 76 77 78 of the selectable magnet 62 will be held closed, and thus form a locked or persistent switch. The detent-contact 103 is also locked on the contact 108, which is thus also a locked switch, and as the contacts 108 of the other three selecting-magnets have been swung up in the manner previously described their circuits are cut out, and they cannot be engaged by the detent-contacts 103 opposite them until the parts are restored after printing the letter, as hereinbefore described. As a result of this first impulse just considered as produced by manipulating the key 1, which is to transmit the letter "A," there will be a temporary contact of the bar 65 of the selectable magnet 62 with the corresponding nine springs 69 of printing-circuits, but without producing the effect of completely closing any printing-circuit, and there will also be a persistent locked closure of nine other circuits at the contacts 75 76 77, also without the effect of completely closing any printing-circuit, while the persistent or locked closure of the contacts 108 103 will have resulted in bringing the printing-battery into circuit with the wire 100, which is connected with the detent-contact 103 corresponding to the selectable magnet 62, and such will have been locked. All the other detents will, however, be held out of circuit with the local printing-battery 112, or, in other words, the rocking of the rock-shaft 109 in removing the three contacts 108 will have cut out all the circuits except those which pass through wire 100. The next impulse over the main line caused by the manipulation of said key will be a weak positive one, and the armature 49 of the polarized magnet 48 will be swung to the right against the contact 54, and the circuit of the selectable magnet 61 is closed in the manner aforesaid and its armature attracted, and the bar 66 of the said selectable magnet 61 is brought into temporary contact with the nine springs 69 of the printing-magnets corresponding to said selectable magnet 61, but also without completely closing any printing-circuit, because all these printing-lines have other breaks. At the same time the contacts 71, 72, 73, and 74 of the selectable magnet 61 are closed and are locked, because the L-shaped lever 125 of the selectable magnet 61 has been released from the restraint of the arm 123 by the first impulse which affected the selectable magnet 62 and is thus in a position to lock the arm 104 corresponding to the selectable magnet 61 under the action of its spring 131. Of course the detent-contact 103 corresponding to the selectable magnet 61 is also swung forward, but cannot engage with the corresponding contact 108, as the latter has been swung up in the manner previously described and is thus out of the path of the end of the corresponding detent-contact 103, as clearly shown by dotted lines in Fig. 6. Of the three working or printing branches connected with the contacts 71 72 73 of the selectable magnet 61 the only one that is connected with the wire 100 is the contact 71, and it must be borne in mind that this wire 100 is the only one that has been brought in circuit with printing-battery. By this second impulse, therefore, a break has been closed at the contact 71 in one of the branches of the wire 100, which by the first impulse was electrically connected with the printing-battery by the detent-contact 103 and the contact 108 corresponding to the selectable magnet 62, and the only break now existing in the working or printing branch for the letter "A" (which we are assuming is to be printed) is between the one spring 69 of the printing-magnet of this line and the bar 65 of the selectable magnet 62. This spring 69 is below the bar 65 of the selectable magnet 62 which received the first impulse, and therefore the third impulse produced by the manipulation of the key 1 under consideration will send through the main line from the transmitter a negative weak impulse, and the armature of the first selectable magnet 62 will be attracted, so as to cause the adjacent bar 65 to be pressed against the corresponding nine springs 69. By these three impulses the circuit of the single printing-magnet corresponding to this letter "A" will be closed, and this line will be the only one closed. Finally, the shunt is broken in the manner previously described and the lock-switches and cut-out are released, so that the next letter can be printed. If, for example, it is desired to print the letter "C," the third impulse will be one energizing the selectable magnet 64, because the printing-magnet for this letter is in a group of nine corresponding to the selectable magnet 64. The other impulses will be the same as for the letter "A." If it had been desired to print the letter "R," which has the spring 69 of its printing-line adjacent to the bar 68 of the selectable magnet 63, it would be necessary to energize the selectable magnet 63 by the third impulse.

The slightly-modified construction of the receiver illustrated in diagram by Fig. 13 and in side view in Fig. 14 is in general like the construction previously described and differs only in the construction of the mechanism for locking the switches and in the shunt-circuit. In the modified construction the switches are locked by electrical devices in place of mechanical devices, as in the receiver previously described. In the modified construction the selectable magnets 61, 62, 63, and 64 do not close the contacts 75 76 77 78 and 71 72 73 74 and 83 84 85 86 and 79 80 81 82, but only severally bring one of the bars 65 or 66 or 67 or 68 into contact with the corresponding nine springs 69 of the printing-circuits. An electromagnet 146 or 147 or 148 or 149 is in the circuit of each selectable magnet 61 or 62 or 63 or 64—that is, each selectable magnet 61 or 62 or 63 or 64 is so connected with a magnet 146 or 147 or 148 or 149 that the current from the local battery 50, passing through any one selectable magnet 61 or 62 or 63 or 64, must also pass through the magnet 146 or 147 or 148 or 149, connected therewith. If a weak negative impulse is sent over the main line 24, the armature 49 of the polarized magnet 48 comes in contact with the contact 52, the armature 57 of the neutral magnet 55 resting against the contact 58, and the current from the local battery 50 passes from the contact 52 through the wire 150 to the selectable magnet 62, through the wire 151 to the magnet 147, connected with the selectable magnet 62, and through the wire 152 to the contact 58, the armature 57 of the neutral magnet 55 to the local battery 50, and in a corresponding manner the circuits of the remaining selectable magnets 61 or 63 or 64 are changed from the circuits as first described. Furthermore, the magnet 90 and the locking devices operated by the same of the first-described form of the invention are dispensed with, but the shunt-circuit is retained. The wire 91 of the shunt-circuit is connected by the wires 153 154 155 156 with the magnets 146 147 148 149, respectively, and each magnet 146, 147, 148, and 149 is connected by a wire 157 158 159 160 with one of the contacts 78 or 74 or 86 or 82 of each pair of such contacts, and the opposite contact of each pair 78 or 74 or 86 or 82 is connected by a wire 161 or 162 or 163 or 164 with the wire 88 of the shunt-circuit, as is clearly shown in the diagram Fig. 12. The four groups of contacts 75 76 77 78 and 71 72 73 74 and 83 84 85 86 and 79 80 81 82 are arranged vertically below the armatures 165 of the four magnets 146 147 148 149, one of such groups of four contacts being under each armature. Each armature 165 carries on its under side a transverse bar 166, of insulating material, above the free ends of such group of four pairs of contacts, and one contact of each pair is so bent at its upper end that when said bar 166 is moved downward when the armature carrying it is attracted by its magnet said bar 166 presses the upper ends of the four curved contacts against the opposite contacts, as is shown in Fig. 15.

In the construction first described the engagement of a spring-tongue with a detent was produced by means of that selectable magnet 61 or 62 or 63 or 64 which was first energized for each character to be printed. In the modified construction the switches corresponding to those formed by the springs and detents are operated by the armatures of the magnets 146 or 147 or 148 or 149, of which armatures one is connected by a wire with each of the wires 97 or 98 or 99 or 100, as shown in Fig. 12. Each armature 165 is provided on its free end with a downwardly-extending detent 167 and a short distance from the free end with a downwardly-extending rod 168. In standards 169 a rock-shaft 170 is mounted and is connected by a wire 171 with one terminal of the local printing-battery 112, the other terminal of which is connected by the wire 113, in the manner previously described, with the four bars 65, 66, 67, and 68. The rock-shaft 170 is provided with a radial arm 172 below each rod 168, the lower end of said rod being normally directly above and in close proximity to a button 173, of insulating material, on the arm 172 below the rod 168. Below each armature 165 a spring-tongue 174 projects upward from the rock-shaft 170 and is so curved that its upper end is normally slightly in front of the detent 167 on the armature 165 above it, and these tongues 174 are of such length that when the armatures above them are raised and the rock-shaft 170 is turned to swing said tongues to the right the upper ends of the said tongues can swing freely under the detents 167 above them. Whenever the circuit of any one of the magnets 146 or 147 or 148 or 149 is closed, with that of the selectable magnet 61 or 62 or 63 or 64 connected therewith, and the armature of such magnet 146 or 147 or 148 or 149 is thus attracted, the rod 168 on said armature presses down the arm 172 directly below it on the rock-shaft 170, which latter is thus turned axially. All four tongues 174 on said rock-shaft 170 are thereby swung to the right, and those three tongues 174 below the armatures of magnets that have not been energized are swung into the position shown in dotted lines in Fig. 14; but the tongue 174 below the armature of the magnet that has been energized cannot swing into the position shown in dotted lines, as it is caught by the descending detent 167 of said armature above it, and the switch formed by said spring-tongue and the detent above it is thus closed. No other such switch can be closed by the subsequent energizing of a magnet 146 or 147 or 148 or 149, as the remaining tongues 174 have been swung beyond the reach of the detents 167 corresponding thereto and remain in these positions as long as the said armature remains attracted, for the reason that the rod 168 of this armature bears on the corresponding arm 172 as long as the corresponding magnet remains energized and the armature attracted.

The printing of the letter "A" will be explained for illustration. It requires a weak negative, a weak positive, and a weak negative impulse successively over the main line, as has been pointed out. The first impulse produced by the manipulation of the proper key 1 causes the closing of the circuit of the magnets 62 and 147, and thereby the bar 65 of the selectable magnet 62 is pressed against the nine springs 69 opposite it, but without effect, and at the same time the armature of the magnet 147 is attracted, and thereby the four pairs of contacts 75 76 77 78 are closed, and the tongue 174 corresponding to the magnet 147 is engaged with the detent 167 on the armature 165 of this magnet 147 and the switch formed by such spring-tongue and detent is closed. By bringing the contacts 78 below the armature of the magnet 147 together the shunt-circuit is closed through the wires 158 162, and thus the magnet 147 remains energized, and the switches formed by the pairs of contacts 75 76 77 78 and the tongue 174 and detent 167 corresponding to the magnet 147 remain closed. The second impulse over the main line—a weak positive one—causes the energizing of the magnets 61 and 146, and thereby the bar 66 of the selectable magnet 61 is brought in contact with the nine springs 69 opposite it, also without effect, and at the same time the switch formed by the contacts 71 72 73 74 is closed and the shunt-circuit through wires 157 and 161 and magnet 146 is closed and the latter remains energized, thus locking said switch. The contacts 71 of this group are connected with the detent 167 of the magnet 147 and the springs 69 of the printing-magnet corresponding to the letter "A," respectively. The switch formed by the tongue 174 and detent 167 of the magnet 146 is not closed, for the reasons previously explained. The third impulse over the main line—a weak negative one—energizes the magnets 62 and 147 again, and thereby the armature of the selectable magnet 62 is attracted, the printing-circuit of the letter "A" is closed, the letter is printed, and the circuit of the shunt-line is broken in the manner described, and all the armatures 165 of the magnets 146 147 148 149 are withdrawn by their springs and all parts restored to the normal positions ready for printing the next letter.

What I claim is—

1. An electrical apparatus for printing or other purposes, comprising a number of working circuits or branches each including a working magnet and having at least three breaks or gaps, controllable magnets each responding to a characteristic kind of impulse, sets of switches operated by the controllable magnets and each set closing breaks in different working circuits, but not all the breaks in any one working circuit and the operation of particular sets of switches in a certain order of three at the least closing all the breaks of a particular working circuit.

2. An electrical apparatus for printing or other purposes, comprising a number or working circuits or branches each including a working magnet and having at least three breaks or gaps, controllable magnets each responding to a characteristic kind of impulse, sets of switches operated by the controllable magnets and each set closing breaks in different working circuits, but not all the breaks in any one working circuit and the operation of particular sets of switches in a certain order of three at the least, one of which sets is operated twice, closing all the breaks of a particular working circuit.

3. An electrical apparatus for printing or other purposes, comprising a number of working circuits or branches each including a working magnet and having at least three breaks or gaps, controllable magnets each responding to a characteristic kind of impulse, sets of switches operated by the controllable magnets, each set composed of a combined locking-switch and cut-out, a locking-switch and a temporary switch and each set closing breaks in different working circuits but not all the breaks in any one working circuit and the operation of particular sets of switches in a certain order of three at the least closing all the breaks of a particular working circuit.

4. An electrical apparatus for printing or other purposes, comprising a number of working circuits or branches each including a working magnet and having at least three breaks or gaps, controllable magnets each responding to a characteristic kind of impulse, sets of switches operated by the controllable magnets, each set composed of a primary locking-switch, a secondary locking-switch, a temporary switch and a cut-out for the primary locking-switches of the other sets, and the operation of particular sets of switches in a certain order of three at the least closing all the breaks of a particular working circuit.

5. In an electrical apparatus for printing or other purposes, a working circuit and branches in which said circuit is divided into primary branches, then each primary branch into secondary branches, and each secondary branch into tertiary branches, in which latter the several working magnets are placed and each primary, secondary and tertiary branch being provided with a break, in combination with sets of electrical switches, each set controlling a break in a primary, secondary and tertiary branch circuit.

6. In an electrical apparatus for printing or other purposes, a working circuit and branches in which said circuit is divided into primary branches, then each primary branch into secondary branches, and each secondary branch into tertiary branches, in which latter the several working magnets are placed and each primary, secondary and tertiary branch being provided with a break, in combination with sets of electrical switches, each set controlling a break in a primary, secondary and tertiary branch belonging to different working circuits, but not in a particular working circuit.

7. An electrical apparatus for printing or other purposes, comprising a number of working circuits or branches each including a working magnet and having breaks or gaps, selectable magnets each responding to a characteristic kind of impulse, sets of switches operated by the selectable magnets, and each set closing breaks in different working circuits, but not all the breaks in any one working circuit and the operation of particular sets of switches in a certain order closing all the breaks of a particular working circuit, and selecting-magnets and circuits therefor controlling the selectable magnets.

8. An electrical apparatus for printing or other purposes, comprising a number of working circuits or branches each including a working magnet and having breaks or gaps, selectable magnets each responding to a characteristic kind of impulse, sets of switches operated by the selectable magnets, and each set closing breaks in different working circuits but not all the breaks in any one working circuit and the operation of particular sets of switches in a certain order closing all the breaks of a particular working circuit, and selecting-magnets and circuits therefor controlling the selectable magnets comprising a polarized relay and a neutral relay.

9. An electrical apparatus for printing or other purposes, comprising a number of working circuits or branches each including a working magnet and having breaks or gaps, selectable magnets each responding to a characteristic kind of impulse, sets of switches operated by the selectable magnets, and each set closing breaks in different working circuits but not all the breaks in any one working circuit and the operation of particular sets of switches in a certain order closing all the breaks of a particular working circuit, and selecting-magnets comprising a polarized relay and a neutral relay in a main-line circuit and controlling local circuits including the selectable magnets.

10. In an electrical apparatus for printing or other purposes, the combination with a transmitter adapted to send electrical impulses of different kinds or characters to line, of a main line, controlling-magnets in said main line, local circuits controlled by said controlling-magnets, controllable magnets included in said local circuits, a number of working circuits each including a working magnet and having breaks, and sets of electrical switches operated by said controllable magnets and closing breaks in different working circuits, but not all the breaks in any one working circuit, and the operation of particular sets of switches in a certain order closing all the breaks of a particular working circuit.

11. In an electrical apparatus for printing or other purposes, the combination with a transmitter having a series of keys, each key being adapted to send electrical impulses of different kinds or characters to line, of a main line, selecting-magnets comprising a polarized relay and a neutral relay in said main line, local circuits controlled by said magnets and including controllable magnets, working circuits each including a working magnet and having breaks, and sets of electrical switches controlling said breaks and controlled by said controllable magnets, each set of switches comprising two locking-switches, a temporary switch and a cut-out, the arrangement being such that each set of switches closes breaks in different working circuits, but not all the breaks in any one working circuit, and the operation of particular sets of switches in a certain order of three, wherein the operation of one of the sets is repeated, closes all the breaks of a particular working circuit.

12. A printing-telegraph receiver comprising a type-writer having key-levers and printing-magnets for actuating said key-levers, branch working circuits including said printing-magnets and having gaps, sets of switches controlling said gaps, and a series of controllable magnets controlling said switches, each set of controllable magnets responding to a characteristic kind of impulse and operating the sets of switches, each set closing breaks in different working circuits, but not all the breaks in any one working circuit and the operation of particular sets of switches in a certain order of three at the least closing all the breaks of a particular working circuit.

13. In a printing-telegraph, the combination with a transmitter adapted to send electrical impulses of different kinds or characters, two of which are positive and of different strengths and two of which are negative and of different strengths, of a receiving instrument comprising a selecting mechanism adapted to respond to combinations of any three of said impulses, differing in kind or order or both, and printing mechanism including working magnets, connections and controlling devices whereby any one of said working magnets can be operated by combinations of any three of said impulses, one of which may be a repetition of the first impulse.

14. In a telegraphic printing apparatus, the combination of a receiving instrument comprising selecting-magnets one of which is a polarized relay 48 and the other a neutral relay 55, selectable magnets 61, 62, 63, 64 controlled by said selecting-magnets, a local printing-circuit including a battery 112, a conductor 111, branches 97, 98, 99, 100 each including a break, each branch having secondary branches including breaks as 75, 71, 83, 79, and each branch having tertiary branches each including a working magnet 92 and having a break 69, conducting-bars 65, 66, 67, 68, connected to the printing-battery, and sets of switches adapted to be operated by the selectable magnets 61, 62, 63, 64, each set of switches closing breaks in different working circuits but not all the breaks in any one working circuit, and the operation of particular sets of switches in a certain order of three closing all the breaks of a particular working circuit.

15. In a telegraphic printing apparatus, the combination of a receiving instrument comprising selecting-magnets one of which is a polarized relay 48 and the other a neutral relay 55, selectable magnets 61, 62, 63, 64 controlled by said selecting-magnets, a local printing-circuit including a battery 112, a conductor 111, branches 97, 98, 99, 100, each including a break, each branch having secondary branches including breaks as 75, 71, 83, 79, and each branch having tertiary branches each including a working magnet 92 and having a break 69, conducting-bars 65, 66, 67, 68 connected to the printing-battery, and sets of switches each comprising a primary locking-switch and cut-out, a secondary locking-switch and a tertiary switch each adapted to close breaks in different working circuits but not all the breaks in any one working circuit, and the operation of particular sets of switches in a certain order of three closing all the breaks in a particular working circuit.

16. In a transmitter for printing-telegraphs, the combination with a local transmitter-battery, a main line and main-line battery, of a series of keys, contacts in branch circuits of the local battery, and a series of electromagnetic pole-changers, the magnets of which are in the branch circuits of said local battery through said contacts and the armatures of which carry contacts which send current impulses to line of a character and order depending on the key-contacts closed by the keys.

17. In a transmitter for printing-telegraphs, the combination with the keys, key-contacts, local battery, line, and line-battery, of a series of electromagnetic pole-changers, the magnets of which are in branch circuits with the key-contacts and local battery.

18. In a transmitter for printing-telegraphs, the combination with the keys, key-contacts, local battery, line, and line-battery, of a series of electromagnetic pole-changers, the magnets of which are in branch circuits with the key-contacts and local battery and the armatures of which carry contacts controlling the main-line currents.

In testimony whereof I have signed my name to this specification in the presence of two subscribing witnesses.

GEORGE ALEXANDER CARDWELL.

Witnesses:
H. COUTANT,
J. EUGENE SONNE.